United States Patent

Lopes, Jr.

[15] 3,699,316

[45] Oct. 17, 1972

[54] STRAPPED-DOWN ATTITUDE REFERENCE SYSTEM

[72] Inventor: Louis A. Lopes, Jr., Pasadena, Calif.

[73] Assignee: The United States of America as represented by the Secretary of Navy

[22] Filed: May 19, 1971

[21] Appl. No.: 144,933

[52] U.S. Cl...........235/150.25, 73/178 R, 235/150.2
[51] Int. Cl................................................G06g 7/78
[58] Field of Search.........235/150.2, 150.25, 150.26, 235/150.27; 318/584–586, 588, 647–649, 651; 73/178 R

[56] References Cited

UNITED STATES PATENTS

| | | |
|---|---|---|
| 3,547,381 | 12/1970 | Shaw et al.........235/150.25 X |
| 3,231,726 | 1/1966 | Williamson.......235/150.25 X |
| 3,576,124 | 4/1971 | O'Connor............73/178 R X |
| 3,545,266 | 12/1970 | Wilson.................73/178 R X |
| 3,509,765 | 5/1970 | Stevenson et al. .......73/178 R |
| 3,232,103 | 2/1966 | Schneider................73/178 R |

Primary Examiner—Eugene G. Botz
Assistant Examiner—Jerry Smith
Attorney—Richard S. Sciascia, Ervin F. Johnston and John Stan

[57] ABSTRACT

A "strapped-down" attitude reference system, that is one which uses three constrained rate-sensing gyros rather than free gyros. In addition, three accelerometers are used to obtain a vertical reference, and two magnetometers are used to obtain the azimuth of the reference system. The invention operates by maintaining two vectors, one aligned with the earth's gravity vector and the other with the local geomagnetic field. The components of the two vectors with respect to body-fixed orthogonal axes are continuously computed by integration of appropriate equations. Implementation of the invention is exemplified by an analog system, but may be accomplished in a digital manner.

The invention provides an attitude reference for vehicles in the earth's gravitational field, such as aircraft, tanks, submarines, and torpedoes. These vehicles undergo short term maneuvers in which the reference provided by gravity is lost because of the vehicle acceleration.

4 Claims, 2 Drawing Figures

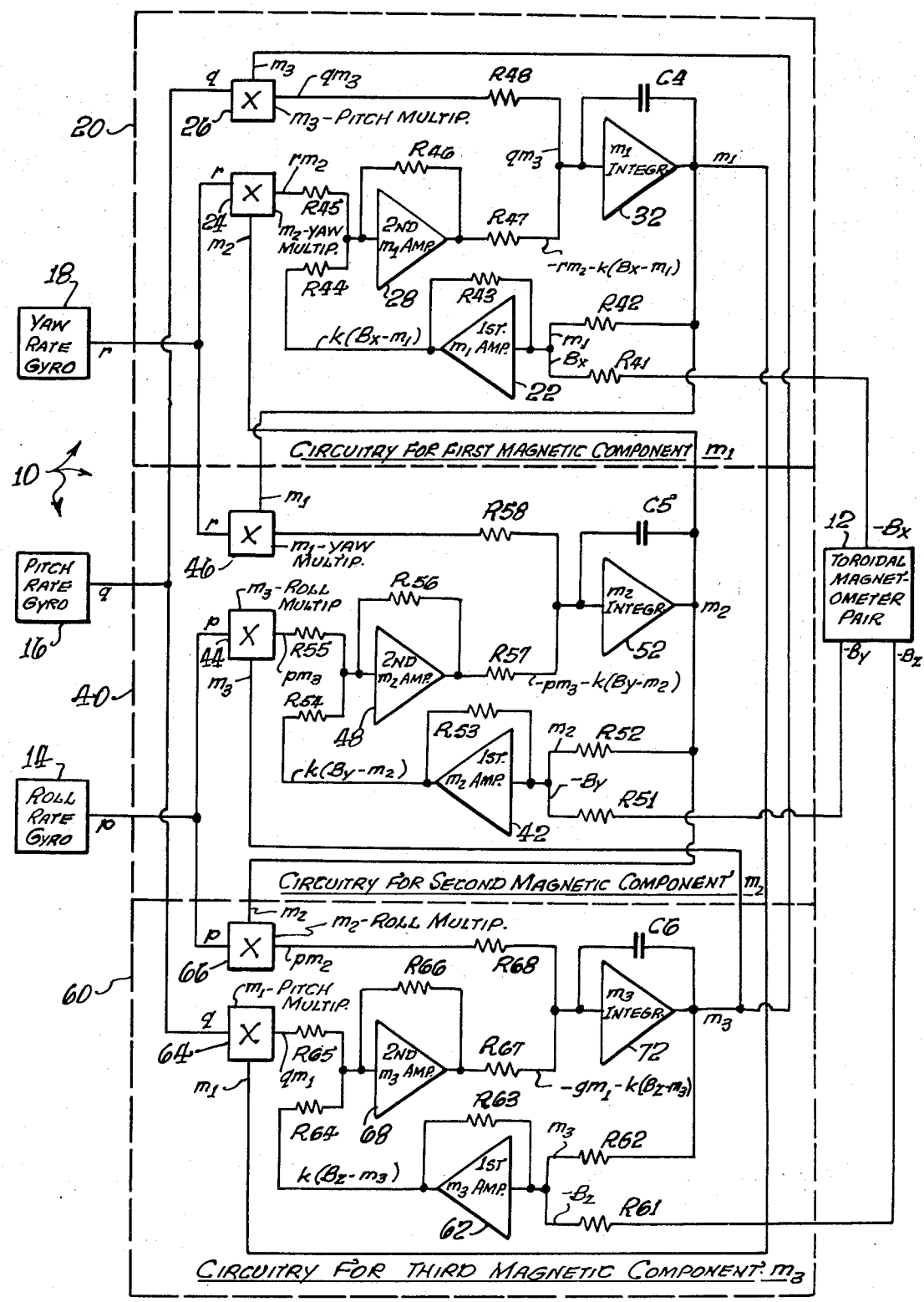
Fig. 1. AZIMUTH REFERENCE SYSTEM.

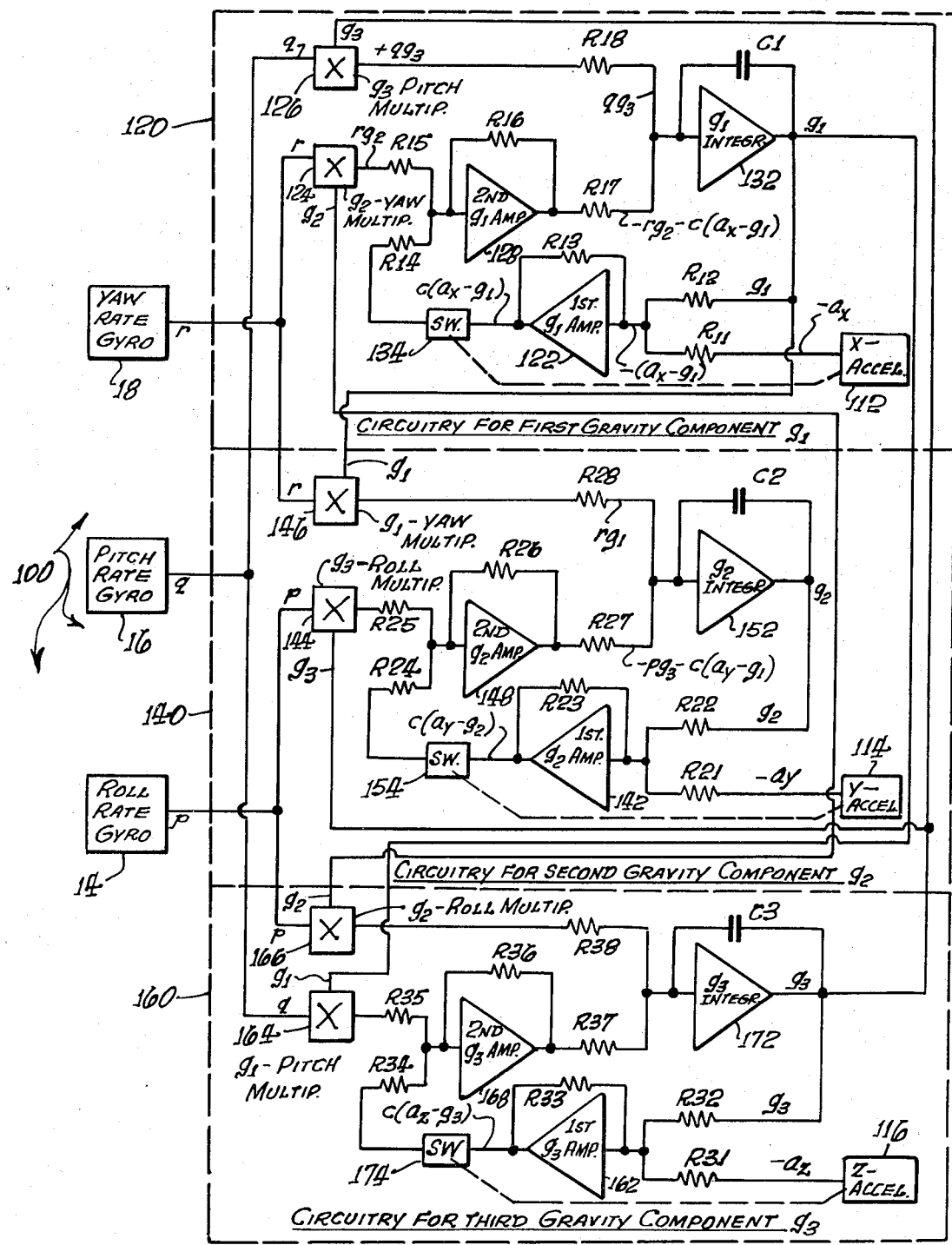
FIG. 2. VERTICAL REFERENCE SYSTEM

STRAPPED-DOWN ATTITUDE REFERENCE SYSTEM

STATEMENT OF GOVERNMENT INTEREST

The invention described herein may be manufactured and used by or for The Government of the United States of America for governmental purposes without the payment of any royalties thereon or therefor.

BACKGROUND OF THE INVENTION

In the prior art, the aircraft directional gyro and artificial horizon were used. The former device provides an azimuth reference that is maintained by a free gyro for the short term, while drift of the gyro is corrected by averaging of a magnetic compass heading. The latter device, the artificial horizon, uses a free gyro for vertical reference. The gyro drift is corrected by reference to an average pendulum position.

Presently used systems generally use free gyros, which are subject to "tumbling," because of the serious malfunction called "gimbal lock" to which a free gyro is susceptible under certain conditions.

The attitude reference system of this invention is not subject to this type of malfunction, inasmuch as in the system of this invention, the problem of "tumbling" does not arise, since there are no gimbals. Body rates are integrated in order to maintain the reference vectors.

However, the system of this invention is subject to drift, which is compensated for by the accelerometers in the vertical reference system, and magnetometers in the azimuth reference system.

The invention described herein will perform these functions of determining the azimuth reference and the vertical reference by using constrained rate-sensing gyrose rather than free gyros. This type of system is called "strapped-down." In the prior art, strapped-down inertial guidance systems have been used in missiles. In these applications very expensive low-drift gyros are used. This is necessary because the missile is always in a state of acceleration or free fall, so that a gravitational reference is not available. A strapped-down system can be made rugged to withstand shocks that could damage a system using free gyros. Thus the strapped-down system is attractive in applications where high shocks are encountered, such as in tanks or torpedoes. However, the high cost of the inertial guidance system employed in missiles discourages their use in these vehicles. Moreover, it is necessary to maintain the attitude reference for an extended period of time, so that a self-erecting feature becomes necessary.

A strapped-down system erecting to the earth's gravity and magnetic field is under development by Elliott Flight Automation Ltd. of Rochester, Kent, U.K., and is described in their publication entitled "A 'Strapped-Down' Attitude Sensing Unit for Torpedo Guidance." In contrast to the implementation described herein, this system is based on computation of the Euler angles, which has the disadvantage of what is known as the Euler angle ambiguity.

The Euler angle ambiguity arises in the following manner: Under certain conditions, there is a singularity in the Euler angles. If the pitch is straight (vertically) downward, so that it coincides with what would normally be the azimuth axis, a roll angle cannot be defined uniquely, nor a yaw angle. This arises from the fact that, in the process of determining the attitude, an integration is performed which gives a singularity at a pitch angle of 90°. In the attitude reference system of this invention, the singularity does not arise.

SUMMARY OF THE INVENTION

This invention relates to a strapped-down attitude reference system, including an azimuth reference system for maintaining a vector $\bar{M}$ aligned with the geomagnetic field and continuously computing its components $m_1$, $m_2$ and $m_3$ with respect to a vehicle-fixed reference frame $(x, y, z)$. The azimuth reference system includes a toroidal magnetometer pair for measuring signals corresponding to the components $B_x$, $B_y$ and $B_z$ of the geomagnetic vector $B$ with respect to the vehicle-fixed reference frame, and roll, pitch and yaw gyros, for developing signals p, q, and r, respectively, which are the components of the vehicle's angular velocity $\bar{\Omega}$ with respect to the x, y and z axes, respectively. Means are provided for combining signals proportional to the components $B_x$, $B_y$ and $B_z$ of the geomagnetic vector $\bar{B}$ and the signals proportional to the components p, q and r in accordance with the following set of equations:

$$\dot{m}_1 = rm_2 - qm_3 + k(B_x - m_1),$$
$$\dot{m}_2 = pm_3 - rm_1 + k(B_y - m_2),$$
$$\dot{m}_3 = qm_1 - pm_2 + k(B_z - m_3),$$

where the dot is a symbol for a derivative and k is a constant 0.1. Implementation of the above set of equations permits computing the components $m_1$, $m_2$ and $m_3$, of the reference vector aligned with the geomagnetic field.

The strapped-down attitude reference system further comprises a vertical reference system which maintains a vector $\bar{G}$ having components $g_1$, $g_2$ and $g_3$ aligned with the earth's gravity vector. The vertical reference system includes accelerometers which produce acceleration signals $a_x$, $a_y$ and $a_z$, with respect to the vehicle-fixed reference frame. Means are also included for combining signals proportional to the acceleration signals $a_x$, $a_y$ and $a_z$ and the signals proportional to the components p, q and r, in accordance with the following set of equations:

$$\dot{g}_1 = rg_2 - qg_3 + c(a_x - g_1),$$
$$\dot{g}_2 = pg_3 - rg_1 + c(a_y - g_2),$$
$$\dot{g}_3 = qg_1 - pg_2 + c(a_z - g_3),$$

where the dot over the letter g again indicates differentiation and $c \leq 0.1$.

OBJECTS OF THE INVENTION

It is one object of the invention to provide a strapped-down attitude reference system which is not subject to the problem of tumbling.

Another object of the invention is to provide a strapped-down attitude reference system which is not subject to the problem of Euler angle ambiguity.

Other objects, advantages and novel features of the invention will become apparent from the following detailed description of the invention, when considered

BRIEF DESCRIPTION OF THE DRAWINGS

FIG. 1 is a schematic diagram of that part of the strapped-down attitude reference system which relates to the azimuth reference system.

FIG. 2 is a schematic diagram of that part of the strapped-down attitude reference system which relates to the vertical reference system.

DESCRIPTION OF THE PREFERRED EMBODIMENTS

Referring now to FIG. 1, therein is shown that part of a strapped-down attitude reference system, which includes an azimuth reference system 10, for maintaining a vector $\bar{M}$ aligned with the geomagnetic field and continuously computing its components $m_1$ $m_2$ and $m_3$ with respect to a vehicle-fixed reference frame $(x, y, z)$, which may be the roll, pitch and yaw axes of the vehicle. The azimuth reference system 10 includes a toroidal magnetometer pair 12 for measuring signals corresponding to the components $B_x$, $B_y$ and $B_z$ of the geomagnetic vector $\bar{B}$ with respect to the vehicle-fixed reference frame. The magnetometer pair 12 are of the type described in the article entitled "Flux-Gate Magnetometer," which appeared in the June 1, 1962 issue of "Electronics," pages 48–52. Roll, pitch and yaw gyros, 14, 16 and 18, respectively, develop signals $p$, $q$, and $r$, respectively, which are the components of the vehicles's angular velocity $\bar{\Omega}$ with respect to the $x$, $y$ and $z$ axes, respectively.

Means, 20, 40 and 60, are included for combining signals proportional to the components $p$, $q$ and $r$ and the signals proportional to the components $B_x$, $B_y$ and $B_z$ in accordance with the following set of equations:

$$\dot{m}_1 = rm_2 - qm_3 + k(B_x - m_1),$$

$$\dot{m}_2 = pm_3 - rm_1 + k(B_y - m_2),$$

$$\dot{m}_3 = qm_1 - pm_2 + k(B_z - m_3),$$

where the dot is a symbol for a derivative and k is a constant $\leq 0.1$, to thereby compute the components $m_1$, $m_2$ and $m_3$, of the reference vector aligned with the geomagnetic field. The above set of equations is an expansion of the vector equation $$\dot{\bar{M}} = \bar{M} \times \Omega + k(\bar{B} - \bar{M}),$$

where the $(x)$ symbol indicates a vector product. The value assigned to $k$ is chosen to minimize the effects of local variation of the geomagnetic field. Normally a value $k \leq 0.1$ is desirable.

In general, the geomagnetic vector will not point exactly in the direction of the magnetic North pole, but rather in the direction of the local lines of magnetic force.

The difference between the geomagnetic vector $\bar{B}$ having components $B_x$, $B_y$ and $B_z$, and the reference azimuth vector $\bar{M}$ having components $m_1$, $m_2$ and $m_3$ is the following: The geomagnetic vector $\bar{B}$ will be affected by magnetic "noise" as the vehicle moves about, and it will therefore give an inaccurate reading at such a time, since there will be variations in the readings. The reference azimuth vector is not affected by the local variations in magnetic field intensity, and hence will give an average reading.

Referring back to FIg. 1, the means for combining the signals comprises circuitries 20, 40 and 60 for a first, $m_1$, second, $m_2$ and third, $m_3$, magnetic component, respectively, having as one of its inputs a signal from the magnetometer pair 12 proportional to the $B_x$, $B_y$ and $B_z$ components, respectively. As two other inputs, there are, respectively, signals proportional to the outputs $r$ and $q$ from the yaw and pitch gyros, 18 and 16, signals proportional to the outputs $p$ and $r$ from the roll and yaw gyros, 14 and 18, and signals proportional to the outputs q and p from the pitch and roll gyros, 16 and 14.

Each circuitry for a magnetic component, 20, 40 and 60, comprises a first amplifier means, 22, 42 or 62, whose input is connected to the output of the magnetometer pair 12, for amplifying the output signal corresponding to the $B_x$, $B_y$ and $B_z$ component, and the output signal, $m_1$, $m_2$, or $m_3$, of its circuitry for a magnetic component, 20, 40 or 60, respectively.

Each circuitry 20, 40 and 60 includes a pair of multiplier means, 24 and 26, 44 and 46, 64 and 66, respectively, each means having as inputs the output $m_1$, $m_2$ or $m_3$, as shown in FIG. 1, of one of the circuitries for one of the other magnetic components and the output of one of the gyros, 14, 16 or 18, also as shown in FIG. 1.

Included in each circuitry for a magnetic component 20, 40 and 60, is a second amplifier means, 28, 48 or 68, respectively whose input is connected to the output of one of the multiplier means 24, 44 or 64, respectively, and to the output of the first magnetic component amplifier means 22, 42 or 62, respectively, for amplifying its input signals. Each circuitry for a magnetic component 20, 40, and 60 also includes an integrating circuit, 32, 52 or 72, respectively, whose inputs are the outputs of the second magnetic component amplifier means, 28, 48 or 68, respectively, and one of the multiplier means, 26, 46 or 66, respectively, for obtaining the desired computed azimuth reference vector component, $m_1$, $m_2$ or $m_3$, respectively.

The elements of the three circuitries 20, 40 and 60 are so connected as to implement the set of equations expanded hereinabove, or the vector equation.

As is conventional, in circuitry of the type shown in FIGS. 1 and 2, the triangles in the figures represent operational amplifiers. In the circuits shown in the two figures, they are used as amplifiers when they have a resistor across them, and as integrators when they have a capacitor across them. In all cases, the polarity of the input signal is reversed at the output. Values of the resistors and capacitors are not given, inasmuch as they are not critical, and in some cases are merely decoupling resistors.

FIG. 1 shows the implementation of the azimuth reference system 10 in terms of standard analog computing elements. The operational amplifiers and multiplier units are available as off-the-shelf solid-state integrated microcircuits.

While the azimuth reference system 10, shown in FIG. 1 may be used independently by itself, generally a strapped-down attitude reference system further comprises a vertical reference system 100, as shown in FIG. 2, which maintains a vector $\bar{G}$, having components $g_1$, $g_2$ and $g_3$, aligned with the earth's gravity vector. The vertical reference system 100 includes x-, y-, and z-accelerometers, 112, 114 and 116 which produce acceleration signals $a_x$, $a_y$ and $a_z$, respectively, with respect to the vehicle-fixed reference frame. Means are included for combining signals proportional to the acceleration signals $a_x$, $a_y$ and $a_z$ and the signals proportional to the components $p$, $q$ and $r$, in accordance with the following set of equations:

$$\dot{g}_1 = rg_2 - qg_3 + c(a_x - g_1),$$

$$\dot{g}_2 = pg_3 - rg_1 + c(a_y - g_2),$$

$$\dot{g}_3 = qg_1 - pg_2 + c(a_z - g_3),$$

where the dot over the letter g indicates differentiation, and $c \leq 0.1$, in most cases. This set of equations is an expansion of the vector equation.

$$\dot{\overline{G}} = \overline{G} \times \overline{\Omega} + c(\overline{A} - \overline{G}),$$

where $\dot{\overline{G}}$ is the time rate of change of $\overline{G}$, $\overline{G} \times \overline{\Omega}$ is the vector product of $\overline{G}$ and $\overline{\Omega}$, and $\overline{A}$ is the acceleration vector with components ($a_x$, $a_y$ and $a_z$) measured by the three accelerometers. If the velocity of the vehicle is constant, $\overline{A}$ will be a measurement of the earth's gravitational vector. The value of the constant c is chosen small enough so that accelerations produced in short term maneuvers will not greatly perturb $\overline{G}$, yet large enough to compensate for gyro errors, so that $\overline{G}$ accurately maintains the average value of $\overline{A}$. The value assigned to c will depend on the quality of the rate gyros used in the system and the accuracy required. A value of $c = 0.1$ or less will be suitable for most applications.

The means for combining signals includes circuitries for the first, second and third gravity components, $g_1$, $g_2$ and $g_3$, 120, 140 and 160, respectively, each circuitry having as one input signal the output signal, $-a_x$, $-a_y$ or $-a_z$, from an x-component, y-component, or z-component accelerometer, 112, 114 and 116, respectively, $x$, $y$ and $z$ assumed to correspond to the cyclical sequence number 1, 2 and 3. Each circuitry for a gravity component 120, 140 or 160, also has two input signals corresponding to the other two gravity components. For example, the circuitry for the first gravity component 120 also has inputs from the other two circuitries 140 and 160.

The three gyros 14, 16 and 18 may be the same ones used in the azimuth reference system 10 shown in FIG. 1. The roll rate gyro 14 develops a roll rate signal $p$ which is fed into the circuitries for the second and third gravity components, 140 and 160, the pitch rate gyro 16 develops a pitch rate signal $q$ which is fed into the circuitries for the first and third gravity components 120 and 160, and the yaw rate gyro 18 develops a yaw rate signal $r$ which is fed into the circuitries for the first and second gravity components, 120 and 140. The roll, pitch and yaw gyros 14, 16 and 18, respectively, may be assumed to correspond to the cyclical sequence 1, 2 and 3, respectively.

Each of the three circuitries for a gravity component 120, 140 and 160 of the vertical reference system 100 comprises a first amplifier means, 122, 142 or 162, whose two inputs are the output signal from one of the three accelerometers 112, 114 or 116, respectively, and a signal corresponding to one of the gravity components, $g_1$, $g_2$, or $g_3$, the cyclical sequence numbers of the accelerometer, the circuitry, and the gravity component being the same.

A controllable switch 134, 154 or 174, is connected to the output of the first gravity component amplifier means, 122, 142 or 162, respectively, for disabling the accelerometer output signal during a period of time when the vehicle is undergoing excessive acceleration, generally at the initiation of an operation. For example, if the vertical reference system 100 were used on a torpedo, then, when the torpedo is making a rapid dive, the switches 134, 154 and 174 would be open. The reason for this is that the vertical reference system 100 gives false readings of erection terms under conditions of rapid acceleration. It would be only after the torpedo has leveled off with respect to depth that the switches would again be closed, or enabled, and the erection signals processed.

It should be pointed out that, in the absence of accelerations of the vehicle, the vector having components $a_x$, $a_y$ and $a_z$ will point in the direction of the gravity vector at that point in space. After the switches 134, 154 and 174 have once been closed, they would generally stay closed during normal search maneuvers of the torpedo, inasmuch as, usually, during this time, the acceleration averages out to zero.

Referring back to the vertical reference system 100 shown in FIG. 2, each circuitry for a gravity component 120, 140 and 160 includes a first gravity component multiplier, 124, 144, or 164, respectively, having two inputs: (1) a signal corresponding to that one of the gravity components $g_1$, $g_2$, or $g_3$, having the next higher cyclical sequence number, with 1 being the next higher cyclical number than 3, and (2) a signal from that gyro which has the next lower cyclical sequence number. A second gravity component amplifier means, 128, 148 and 168, has two inputs, a signal from the output side of the switch, 134, 154, or 174, respectively, and the output signal from the first gravity component multiplier 124, 144, or 164, respectively.

Each circuitry for a gravity component 120, 140 and 160 includes a second gravity component multiplier 126, 146 and 166 having two inputs: (1) a signal corresponding to that one of the gravity components having the next lower cyclical sequence number; and (2) a signal from that gyro which has the next higher cyclical sequence number. Finally, each circuitry 120, 140 and 160 includes a gravity component integrator, 132, 152 and 172, respectively, having as its two inputs the outputs of the second gravity component amplifier 128, 148 or 168, and of the second gravity component multiplier, 126, 146, or 166, and for its output the gravity component having the same cyclical sequence number as that of its circuitry.

As may be seen by comparing FIG. 1 with FIG. 2, the circuit of the azimuth reference system 10 is analogous to that of the vertical reference system 100. The accelerometers 112, 114 and 116 that provide the long term vertical reference are replaced by magnetometers 12 that measure the components of the geomagnetic vector with respect to the vehicle-fixed reference frame.

Obviously many modifications and variations of the present invention are possible in the light of the above teachings. It is therefore to be understood that within

What is claimed is:

1. A strapped-down attitude reference system, including an azimuth reference system for maintaining a vector aligned with the geomagnetic field and continuously computing its components $m_1$, $m_2$ and $m_3$ with respect to a vehicle-fixed reference frame $(x, y, z)$, comprising:

a toroidal magnetometer pair for measuring signals corresponding to the components $B_x$, $B_y$, and $B_z$ of the geomagnetic vector with respect to the vehicle-fixed reference frame;

roll, pitch and yaw gyros, for developing signals $p$, $q$, and $R$, respectively, which are the components of the vehicle's angular velocity with respect to the $x$, $y$, and $z$ axes, respectively;

means for combining signals proportional to the components $p$, $q$, and $r$ and the signals proportional to the components $B_x$, $B_y$, and $B_z$ in accordance with the following set of equations:

$$\dot{m}_1 = rm_2 - gm_3 + k(B_x - m_1),$$

$$\dot{m}_2 = pm_3 - rm_1 + k(B_y - m_2),$$

$$\dot{m}_3 = qm_1 - pm_2 + k(B_z - m_3),$$

where the dot is a symbol for a derivative and k is a constant $\leq 0.1$, to thereby compute the components $m_1$, $m_2$, and $m_3$, or the reference vector aligned with the geomagnetic field.

2. A strapped-down attitude reference system according to claim 1, wherein the means for combining the signals comprises circuitries for a first, $m_1$, second, $m_2$, and third, $m_3$, magnetic component, having as one of its inputs a signal from the magnetometer pair proportional to the $B_x$, $B_y$, and $B_z$ components, respectively, and as two other inputs, signals proportional to the outputs $r$ and $q$ from the yaw and pitch gyros, signals proportional to the outputs $p$ and $r$ from the roll and yaw gyros, and signals proportional to the outputs $q$ and $p$ from the pitch and roll gyros, respectively, each circuitry for a magnetic component comprising:

a first amplifier means, whose input is connected to the output of the magnetometer pair for amplifying the output signal corresponding to the $B_x$, $B_y$, or $B_z$ component, and the output signal, $m_1$, $m_2$, or $m_3$, of its circuitry for a magnetic component;

a pair of multiplier means, each means having as inputs the output $m_1$, $m_2$, or $m_3$, of one of the circuitries for one of the other magnetic components and the output of one of the gyros;

a second amplifier means, whose input is connected to the output of one of the multiplier means and to the output of the first magnetic component amplifier means, for amplifying its input signals;

an integrating circuit, whose inputs are the outputs of the second magnetic component amplifier means and one of the multiplier means, for obtaining the desired computed azimuth reference vector component, $m_1$, $m_2$, or $m_3$;

the elements of the three circuitries being so arranged as to implement the said set of equations.

3. A strapped-down attitude reference system according to claim 2, further comprising a vertical reference system which maintains a vector having components $g_1$, $g_2$, and $g_3$ aligned with the earth's gravity vector, the vertical reference system further comprising:

accelerometers which produce acceleration signals $a_x$, $a_y$, and $a_z$, with respect to the vehicle-fixed reference frame;

means for combining signals proportional to the acceleration signals $a_x$, $a_y$, and $a_z$ and the signals proportional to the components $p$, $q$ and $r$, in accordance with the following set of equations:

$$\dot{g}_1 = rg_2 - qg_3 + c(a_x - g_1)$$

$$\dot{g}_2 = pg_3 - rg_1 + c(a_y - g_2)$$

$$\dot{g}_3 = qg_1 - pg_2 + c(a_z - g_3)$$

where the dot over the letter g indicates differentiation, and $c \leq 0.1$.

4. A strapped-down attitude reference system according to claim 3, wherein the second-named means for combining signals comprises:

circuitries for the first, second and third gravity components, $g_1$, $g_2$, and $g_3$, each circuitry having as an input signal the output signal, $-a_x$, $-a_y$, or $-a_z$, from an x-component, y-component, or z-component accelerometer, respectively, $x$, $y$, and $z$ assumed to correspond to the cyclical sequence numbers 1, 2, 3, each circuitry for a gravity component also having two input signals corresponding to the other two gravity components; and wherein the roll rate gyro developes a roll rate signal $p$ which is fed into the circuitries for the second and third gravity components;

the pitch rate gyro developes a pitch rate signal $q$ which is fed into the circuitries for the first and third gravity components;

the yaw rate gyro developes a yaw rate signal $r$ which is fed into the circuitries for the first and second gravity components;

the roll, pitch and yaw gyros assumed to correspond to the cyclical sequence 1, 2, and 3, respectively;

each of the three circuitries for a gravity component of the vertical reference system comprising:

a first amplifier means, whose two inputs are the output signal from one of the three accelerometers and a signal corresponding to one of the gravity components, the cyclical sequence numbers of the accelerometer, the circuitry, and the gravity component being the same;

a controllable switch, connected to the output of the first gravity component amplifier means, for disabling the accelerometer output signal during a period of time when the vehicle is undergoing excessive acceleration;

a first gravity component multiplier having two inputs: (1) a signal corresponding to that one of the gravity components $g_1$, $g_2$, or $g_3$, having the next higher cyclical sequence number, and (2) a signal from the gyro which has the next lower cyclical sequence number;

a second gravity component amplifier means having two inputs, a signal from the output side of the switch and the output signal from the first gravity component multiplier;

a second gravity component multiplier having two inputs: (1) a signal corresponding to that one of the gravity components having the next lower cyclical sequence number; and (2) a signal from the gyro which has the next higher cyclical sequence number;

a gravity component integrator having as its two inputs the outputs of the second gravity component amplifier and of the second gravity component multiplier, and for its output the gravity component having the same cyclical sequence number as that of its circuitry.

* * * * *